United States Patent
Nakao

(10) Patent No.: US 6,665,259 B1
(45) Date of Patent: Dec. 16, 2003

(54) OPTICAL DISK APPARATUS HAVING OPTICAL AXIS ADJUSTING FUNCTION

(75) Inventor: Yoshihiro Nakao, Kawasaki (JP)

(73) Assignee: Fujitsu Limted, Kawasaki (JP)

( * ) Notice: Subject to any disclaimer, the term of this patent is extended or adjusted under 35 U.S.C. 154(b) by 547 days.

(21) Appl. No.: 09/621,428

(22) Filed: Jul. 21, 2000

(30) Foreign Application Priority Data

Oct. 29, 1999 (JP) .......................................... 11-309497

(51) Int. Cl.[7] .............................................. G11B 17/00
(52) U.S. Cl. ...................................................... 369/244
(58) Field of Search ............................. 369/244, 44.15, 369/112.24

(56) References Cited

U.S. PATENT DOCUMENTS

| | | | | |
|---|---|---|---|---|
| 5,764,613 A | * | 6/1998 | Yamamoto et al. | 369/112.24 |
| 6,104,691 A | * | 8/2000 | Yamamoto et al. | 369/118 |
| 6,115,347 A | * | 9/2000 | Ichimura et al. | 369/112.24 |
| 6,160,768 A | * | 12/2000 | Yanagawa | 369/13.32 |
| 6,256,287 B1 | * | 7/2001 | Baartman et al. | 369/244 |
| 6,272,079 B1 | * | 8/2001 | Kanto et al. | 369/44.14 |
| 6,292,453 B1 | * | 9/2001 | Ichimura et al. | 369/112.24 |
| 6,407,975 B1 | * | 6/2002 | Takishima | 369/112.29 |
| 6,414,931 B1 | * | 7/2002 | Maeda et al. | 369/112.24 |

FOREIGN PATENT DOCUMENTS

| | | | | |
|---|---|---|---|---|
| JP | 9251645 | | 9/1997 | |
| JP | 10188333 A | * | 7/1998 | G11B/7/135 |
| JP | 1220980 | | 1/2000 | |

\* cited by examiner

Primary Examiner—David Davis
(74) Attorney, Agent, or Firm—Greer, Burns & Crain, Ltd.

(57) ABSTRACT

An optical disk apparatus includes a carriage, an actuator for performing focus and tracking control, a first lens supported by the actuator, and a suspension member mounted on the carriage. The optical disk apparatus also includes a slider attached to the suspension member to be brought into facing relation to a storage disk. A second lens is supported by the slider to be associated with the first lens. The optical disk apparatus further includes optical axis adjusting means separate from the actuator. The adjusting means is designed to move the first and the second lenses to each other in parallel to the disk member.

14 Claims, 17 Drawing Sheets

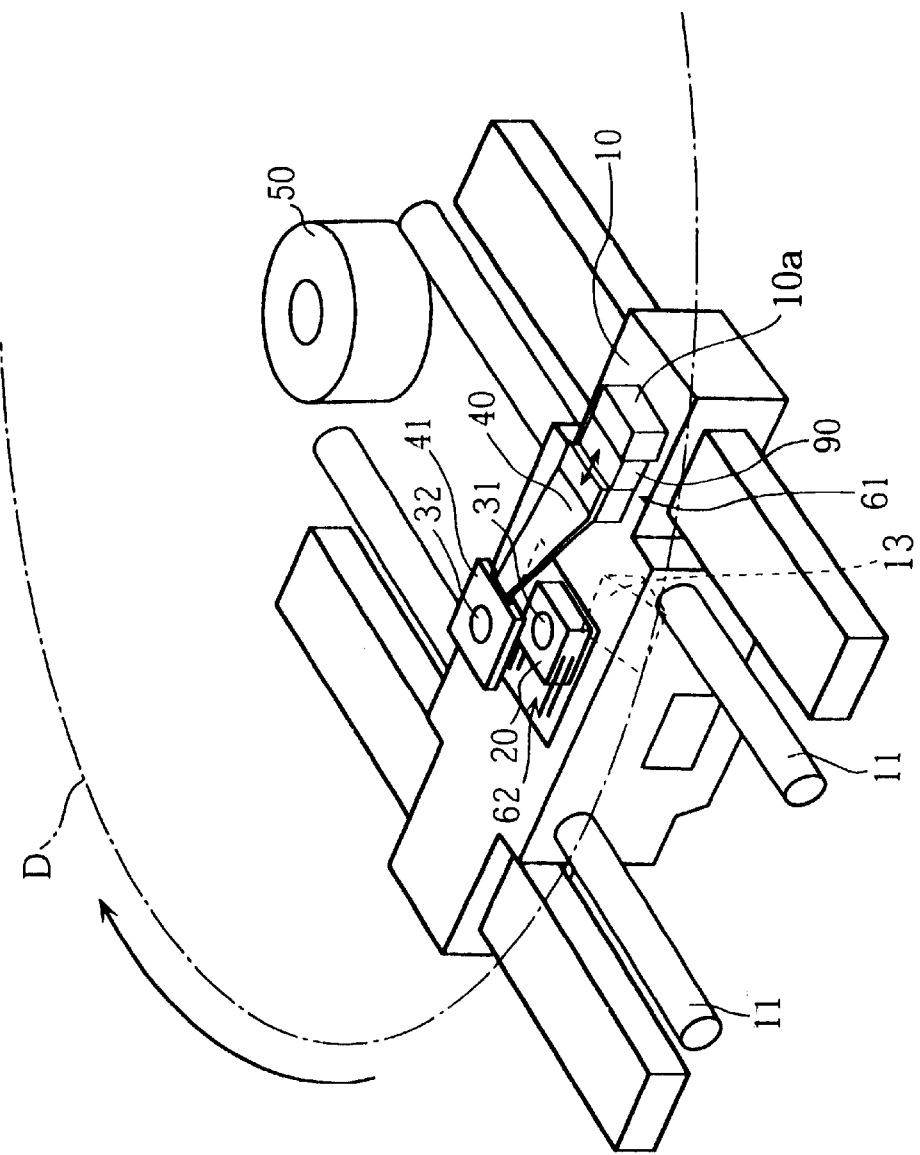

OPTICAL DISK APPARATUS HAVING OPTICAL AXIS ADJUSTING FUNCTION

BACKGROUND OF THE INVENTION

1. Field of the Invention

The present invention relates to an optical disk apparatus. In particular, the present invention relates to an optical disk apparatus of the type which includes a lens system for forming a laser spot on a disk, wherein the lens system includes a first lens mounted on an actuator supported by a carriage, and a second lens mounted on a slider held in facing relation to the disk. In this specification, the "optical disk apparatus" refers not only to a device designed exclusively for reading out data from an optical disk but also to a magneto-optical disk apparatus capable of repeatedly writing data to a magneto-optical disk by magnetic field modulation, light pulse modulation, etc.

2. Description of the Related Art

In general, an optical disk apparatus is arranged to store more data than many other data-storing devices. Thus, various kinds of optical disk apparatus have been developed and widely used as an external storage unit for e.g. computers.

The current data storing capacity of an optical disk apparatus, however, is not large enough to support the full-scale "Multimedia Era" to come. Hence, it is necessary to increase the data-recording density of the optical disk apparatus. For this purpose, the following two techniques may be employed. The first one is to use a semiconductor laser of a shorter wavelength (i.e., a blue semiconductor laser) for a light source, and the second one is to increase the numerical aperture (NA) of an objective used for the optical head.

Blue semiconductor lasers, however, are rather expensive, and their output efficiency is not high enough. Further, they may fail to perform the required functions when the temperature varies. Thus, to use a blue semiconductor laser is not a good idea.

The second option (increasing the NA of the objective) is also disadvantageous in the following points. To increase the NA of an objective, it is necessary to reduce the radius of curvature of the lens surfaces (incidence surface and exit surface). However, to provide the lens surfaces with a small radius of curvature will require a difficult procedure. Further, even if the incidence surface and the exit surface are accurately made and have the intended radius of curvature, they may be tilted or offset relative to each other. Still further, even if the objective lens itself is correctly made (i,e., with the correct radius of curvature and without any erroneous positioning of the two surfaces), the installment of the objective to a supporting member may fail to be performed accurately, thereby rendering the objective slant or offset relative to the supporting member. It is also probable that the optical disk being rotated in operation may be tilted with respect to the objective.

The above-described inappropriateness may give rise to coma (proportional to the NA to the third power). Further, when the optical disk does not have a uniform thickness, spherical aberration (proportional to the NA to the fourth power) will result. The occurrence of coma and spherical aberration may hinder the data-recording and data-reading operations. Since coma and spherical aberration are proportional to the NA of the objective, increasing the NA of an objective may better be avoided.

In this connection, attention should be drawn to e.g. Japanese Patent Application No. 10(1998)-185283 which discloses an optical system consisting of two objectives. It should be noted that this application is laid open on Jan. 21, 2000.

According to the teaching of the above Japanese application, the overall NA of the optical system is increased. In this way, the coma and spherical aberration caused by the increased NA of a single objective are advantageously reduced or even eliminated.

Referring now to FIG. 13 of the accompanying drawings, the principal portions of the optical disk apparatus disclosed in the above Japanese Patent Application (10-185283) will be described below.

Specifically, the optical disk apparatus includes a carriage 10' which is caused to move radially of an optical disk D'. The carriage 10' carries an actuator 20' which in turn holds a first lens 31'. The actuator 20' is a two-dimensional actuator which is movable perpendicularly to the disk D' for focus control and radially of the disk D' for tracking control. A second lens 32' is arranged above the first lens 31', supported by an elongated suspension member 40' fixed to the upper surface of the carriage 10'. The second lens 32' is held by a slider 41' mounted on the upper end of the suspension member 40'.

The first lens 31' and the second lens 32' are arranged vertically so that their optical axes coincide with each other. With such an arrangement, even if the NA of each lens is rather small (meaning that the lens is easy to process), the overall NA of the optical system as a whole can be rendered sufficiently large. Further, in the optical head, the slider 41' is pivotably attached to the upper end of the suspension member 40'. Thus, when the slider 41' is brought close to the disk D', the slider can automatically adjust its posture to be held in close facing relation to the surface of the rotating disk D'. In this manner, the coma due to the tilting of the disk D' is advantageously prevented from occurring. In addition, the spherical aberration due to an uneven thickness of the disk D' is avoided by adjusting the distance between the first and the second lenses 31', 32' by moving the actuator 20' perpendicularly to the disk D'.

While the above optical head has various advantages, it may suffer the following problem. Ideally, the optical axis of the first lens 31' coincides with the axis of the second lens 32', as shown in FIG. 14. However, since the slider 41' is supported by the elongated suspension member 40', the optical axis L1' of the first lens 31' may be horizontally displaced from the optical axis L2' of the second lens 32' (see FIG. 15). This may be caused in part by an error in fixing the slider 41' to the suspension member 40' and/or an error in fixing the suspension member 40' to the carriage 10'. Another cause of the deviation of the axes L1', L2' may be thermal expansion of the suspension member 40' or slider 41'. In this case, the deviation of the optical axes L1', L2' may begin to occur after the optical disk apparatus is turned on. Thereafter, the deviation may expand as the suspension member 40' and the slider 41' are being heated up.

FIG. 16 is a graph showing the relation between the aberration and the discrepancy between the two optical axes L1', L2'. This graph clearly shows that the aberration increases as the two optical axes are spaced further away from each other. As stated above, the actuator 20' carrying the first lens 31' is movable to perform the focus control and the tracking control. Considering this function, the discrepancy between the two axes L1', L2' may need to be smaller than 40 μm for example, so that sufficient data-reading and data-writing margins are ensured. However, the extent of the thermal expansion of the suspension member 40' and/or slider 41' is often unpredictable. Thus, it is difficult or even impossible to assembly the optical head in a manner such that the discrepancy between the two optical axes L1', L2' is to be below 40 μm.

SUMMARY OF THE INVENTION

It is, therefore, an object of the present invention to provide an optical disk apparatus with an optical head which includes an objective lens system consisting of a plurality of lenses, wherein the offset between the optical axes of the respective lenses is adjusted.

Another object of the present invention is to provide a method of adjusting lenses used in an optical disk apparatus.

According to a first aspect of the present invention, there is provided an optical disk apparatus comprising: a carriage movable relative to a data-storing disk member; an actuator mounted on the carriage and movable at least for performing focus control; a first lens supported by the actuator and having a first optical axis; a suspension member provided with a first end and a second end, the suspension member being supported by the carriage via the first end; a slider attached to the second end of the suspension member and brought into facing relation to the disk member; a second lens supported by the slider and having a second optical axis, the second lens being associated with the first lens to make a light spot on the disk member; and optical axis adjusting means provided separately from the actuator and arranged to move the first and the second optical axes relative to each other in parallel to the disk member.

With such an arrangement, a discrepancy between the first and the second optical axes is advantageously eliminated or reduced by operating the optical axis adjusting means.

According to a preferred embodiment of the present invention, the optical axis adjusting means may include a first shifting mechanism and a second shifting mechanism. The first shifting mechanism may move the first and the second optical axes relative to each other in a predetermined direction parallel to the disk member, while the second shifting mechanism may move the two optical axes relative to each other in another direction which is perpendicular to said predetermined direction and parallel to the disk member.

Preferably, the first shifting mechanism may cause the carriage and the disk member to be moved toward and away from each other.

According to a preferred embodiment, the first end and the second end of the suspension member may be spaced from each other tangentially to a track of the disk member.

In the above instance, the second shifting mechanism may include an additional actuator mounted on the carriage for moving the suspension member radially of the disk member.

Preferably, the actuator may be a two-dimensional actuator movable for positional adjustment of the first and the second optical axes.

Preferably, the additional actuator may comprise a piezoelectric element.

According to another preferred embodiment, the first end and the second end of the suspension member may be spaced from each other radially of the disk member.

In the above case, the second shifting mechanism may include an additional actuator mounted on the carriage for moving the suspension member tangentially to a track of the disk member.

According to a preferred embodiment of the present invention, the first shifting mechanism may include a first additional actuator for moving the suspension member tangentially to a track of the disk member, while the second shifting mechanism may include a second additional actuator for moving the suspension member radially of the disk member.

Preferably, the first shifting mechanism may include at least one elongated guiding member movably supporting the carriage. The guiding member may have an end portion which is pivotably connected to a suitable supporting member of the optical disk apparatus.

Preferably, the first shifting mechanism may include a cam held in engagement with the guiding member at a predetermined portion thereof spaced from the pivotably connected end.

With such an arrangement, the guiding member can be moved upward and downward about the pivot upon actuation of the cam.

In the above case, the carriage may be reciprocated between said predetermined portion and the pivotably connected end.

According to another preferred embodiment of the present invention, the first shifting mechanism may include a cam for causing the disk member to move toward and away from the carriage.

According to another preferred embodiment, the optical disk apparatus may comprise a spindle for rotating the disk member, wherein the cam is held in engagement with the spindle.

In the above case, the optical disk apparatus may further comprise a cylindrical shaft for holding the spindle in an axially slidable manner.

According to a second aspect of the present invention, there is provided a method of adjusting positions of first and second lenses used in an optical disk apparatus, wherein the first lens has a first optical axis, and the second lens has a second optical axis. The method comprises the steps of: shifting the first and the second optical axes relative to each other; writing data to a recording disk; reading out the data for obtaining a readout signal; and determining optimum positions of the first and the second optical axes based on the readout signal.

According to a third aspect of the present invention, there is provided a method of adjusting positions of first and second lenses used in an optical disk apparatus using a storage disk. The first lens has a first optical axis, while the second lens has a second optical axis. The method comprises: a first step of offsetting the first lens from the second lens to maximum in a predetermined direction; a second step of writing trial data to the storage disk; a third step of reading out the trial data from the storage disk; a fourth step of calculating an error rate in reading out the trial data; a fifth step of storing the calculated error rate in a memory; a sixth step of moving the first lens relative to the second lens by a predetermined amount; a step of repeating the second through the sixth steps until the first lens is offset to maximum in another direction opposite to said predetermined direction; and a step of finding a position of the first lens relative to the second lens at which the error rate is minimized.

Other features and advantages of the present invention will become apparent from the detailed description given below with reference to the accompanying drawings.

BRIEF DESCRIPTION OF THE DRAWINGS

FIG. 9 is a perspective view showing the principal portions of an optical disk apparatus according to a second embodiment of the present invention;

DETAILED DESCRIPTION OF THE PREFERRED EMBODIMENTS

The preferred embodiments of the present invention will be described below with reference to the accompanying drawings.

Figure 1:
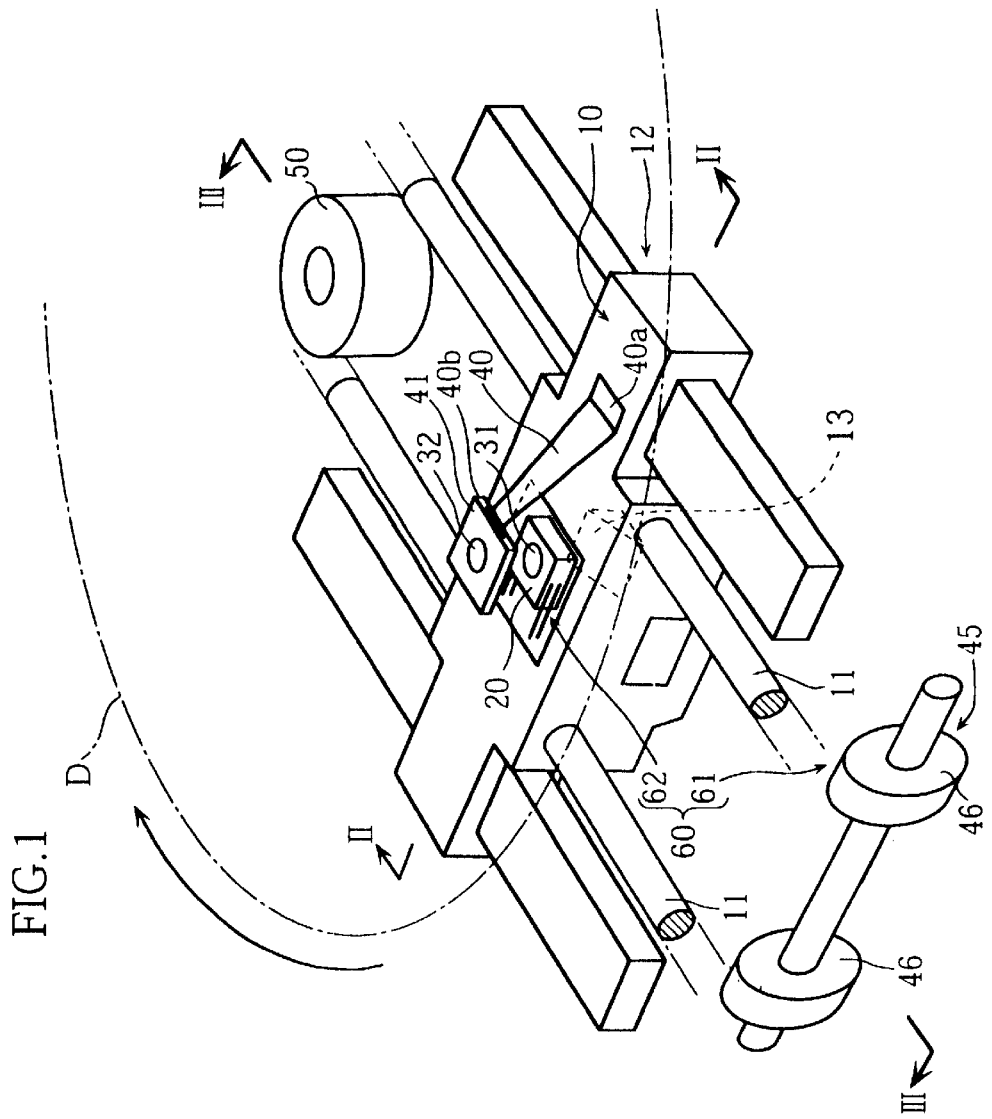
FIG. 1 is a perspective view showing the principal portions of an optical disk apparatus according to a first embodiment of the present invention.
Figure 2:
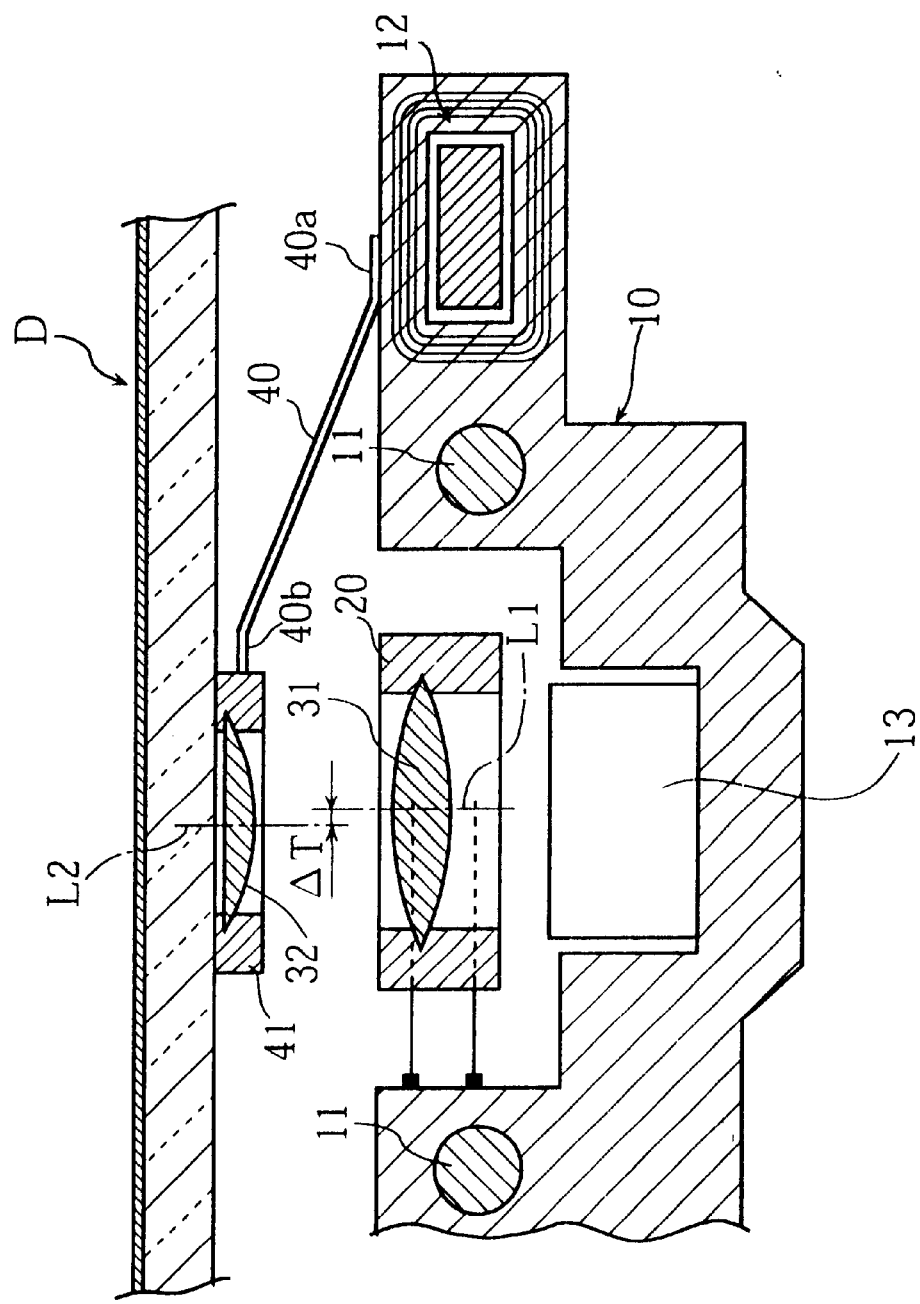
FIG. 2 is an enlarged sectional view taken along lines II—II in FIG. 1.
Figure 3:
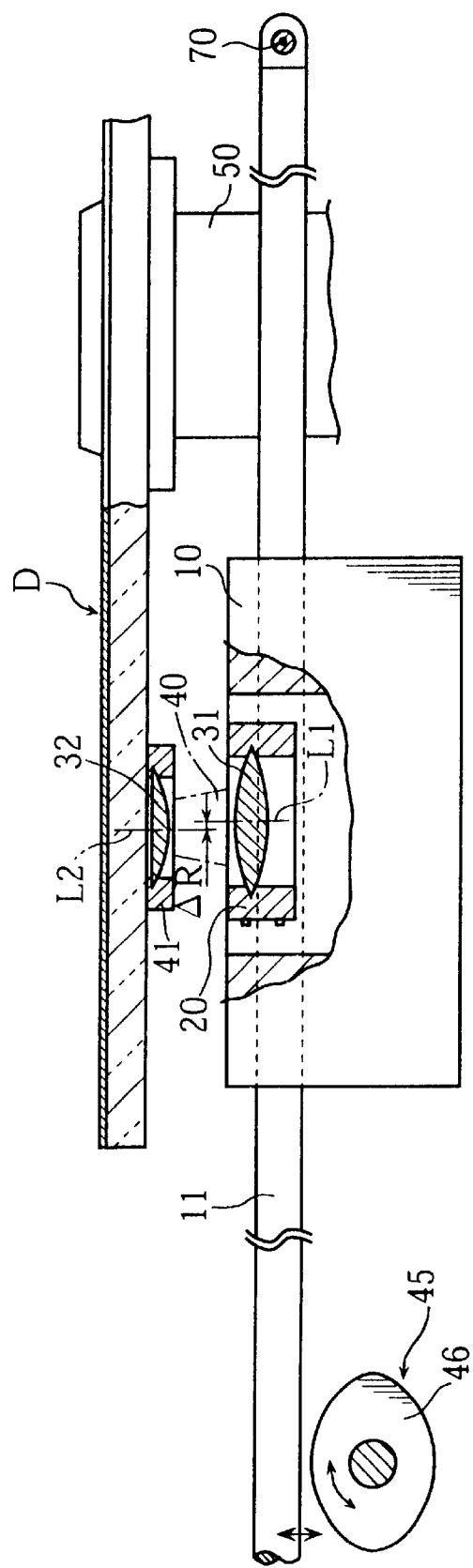
FIG. 3 is an enlarged sectional view taken along lines III—III in FIG. 1.

Reference is first made to FIGS. 1–3 showing the principal portions of an optical disk apparatus according to a first embodiment of the present invention. As shown in FIGS. 1 and 3, the optical disk apparatus is provided with an upright, rotatable spindle 50 to which a disk D (such as a magneto-optical disk) is attached. The disk D is provided with a data-recording layer whose data-writing surface faces downward. This orientation, however, is not limitative and may be altered. Specifically, the data-writing surface may face upward or in a horizontal direction.

Below the disk D, a carriage 10 is slidably supported by two guide members 11 so that it can reciprocate radially of the disk D. For driving the carriage 10, use is made of a linear driving mechanism 12 such as a linear voice coil motor (see FIG. 2). The carriage 10 mounts a lens actuator 20 which in turn carries a first lens 31. As shown in FIGS. 2 and 3, the optical axis L1 of the first lens 31 (simply called "first axis L1" below) extends transversely of the disk D. In the illustrated embodiment, the lens actuator 20 is a two-dimensional actuator that is designed to move the first lens 31 radially of the disk D and (generally) perpendicularly to the recording surface of the disk D.

In the illustrated embodiment, the actuator 20 carries only one lens, though more than one lens may be supported by the actuator 20. Further, instead of being a two-dimensional unit, the actuator 20 may be a one-dimensional device designed to move the first lens 31 only for performing the focus control.

As shown in FIGS. 1 and 2, a slider 41 is supported by the carriage 10 via a suspension member 40. The suspension member 40 is an elongated elastic plate having a lower end 40a and an upper end 40b. As viewed from above (or below), the suspension member 40 extends generally tangentially with respect to the tracks of the disk D (see FIG. 1). The lower end 40a of the suspension member 40 is fixed to the upper surface of the carriage 10, while the upper end 40b is connected to the slider 41 via a gimbal spring (not shown), so that the slider 41 is pivotable on the suspension member 40. As shown in FIG. 2, the suspension member 40 (except the lower and upper ends 40a, 40b) extends at a certain angle with respect to the disk D, so that it gradually approaches the disk D.

In operation, the slider 41 is pressed against the rotating disk D by the suspension member 40. Thus, the slider 41 is held in sliding contact with the rotating disk D or caused to float over the surface of the disk D by fluid wedge action due to the air drawn into the gap between the slider 41 and the disk D. As stated above, the slider 41 is pivotably supported by the suspension member 40. Thus, even if the disk D is tilted on the spindle 50, the slider 41 will adjust its posture relative to the disk D, so that it is held in proper facing relation to the disk surface.

As best shown in FIG. 2, the slider 41 holds a second lens 32 above the first lens 31. The second lens 32 has an optical axis L2 (simply called "second axis L2" below) extending transversely of the disk D.

Though not illustrated, the optical disk apparatus includes a light source to irradiate the disk D for reading or writing data. The light beam emitted from the light source is reflected on a mirror 13 arranged below the first lens 31 (see FIGS. 1 and 2). The reflected light beam, which is directed upward, passes through the first and the second lenses 31, 32 and strikes upon the recording surface of the Disk D.

Figure 15:
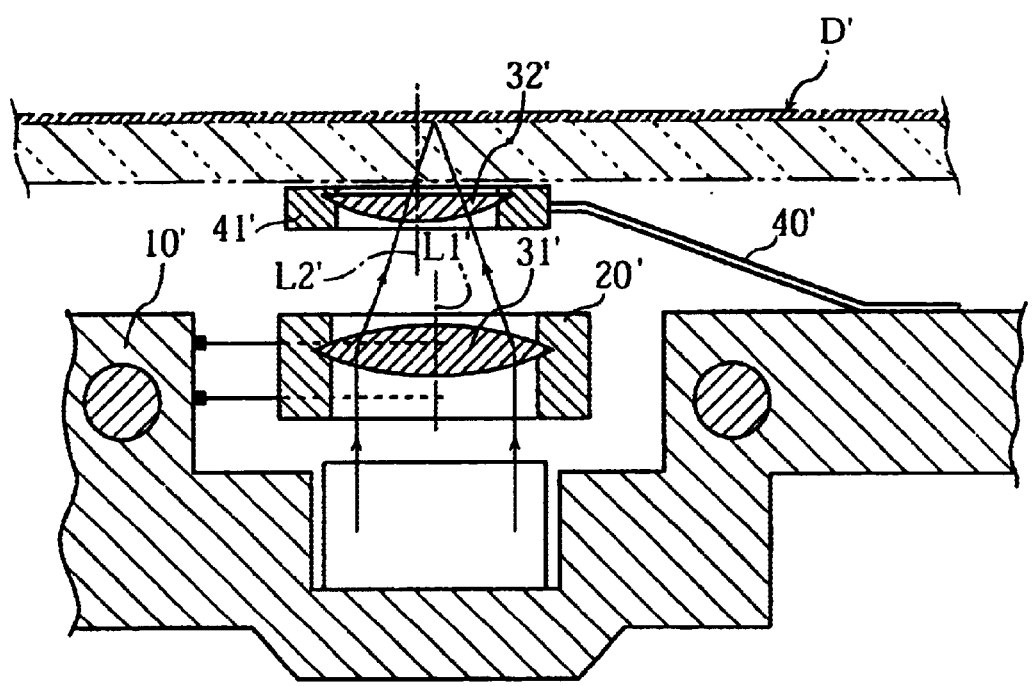
FIG. 15 is a sectional view showing two lenses and other components of the apparatus of FIG. 13, wherein the optical axes of the respective lenses are offset from each other.
Figure 16:
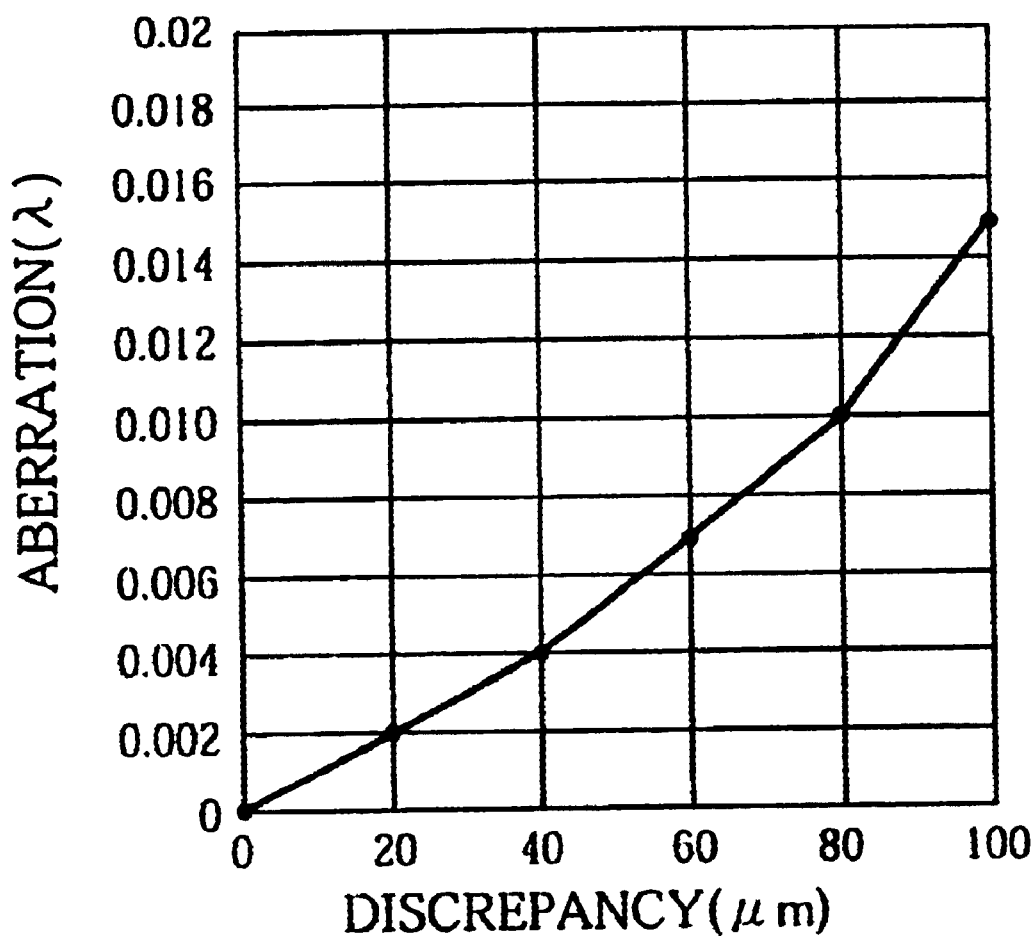
FIG. 16 is a graph showing the relation between the aberration and the discrepancy of the optical axes of the lenses used for the apparatus of FIG. 13.

On the same reasons as previously described with reference to FIG. 15 (Prior Art), the first axis L1 may be unduly offset from the second axis L2. According to the present invention, the discrepancy between the first and the second axes L1, L2 is eliminated or at least minimized by adjusting the relative positions of the two optical axes. For this adjustment, the optical disk apparatus of the first embodiment is provided with lens offset means (optical axis adjusting means) 60 (FIG. 1). The lens offset means 60 is designed to move the first lens 31 relative to the second lens 32, as will be described in detail below.

The lens offset means 60 consists of first shifting means 61 and second shifting means 62 (see FIG. 1). In the illustrated embodiment, the first shifting means 61 is provided separately from the other functional components, while the second shifting means 62 is realized by the actuator 20.

The first shifting means 61 is designed to move the carriage 10 toward and away from the disk D. Thus, the distance between the carriage 10 and the disk D is varied by operating the first shifting mechanism 61. To this end, the first shifting means 61 includes a cam mechanism 45 by which the respective guide members 11 are supported.

Specifically, as shown in FIG. 3, an end of each guide member 11 is pivotably attached to a supporting member (not shown), while an intermediate or end portion of the guide member 11 is supported by a cam mechanism 45. As shown in FIG. 1, the cam mechanism 45 includes a pair of non-circular cams 46 upon which the two guide members 11 are placed. The non-circular cams 46 are fixed to a horizontal shaft to be rotated by a stepping motor (not shown).

With such an arrangement, as shown in FIG. 3, the guide members 11 (only one shown) are caused to pivot about a horizontal axis 70 upon actuation of the non-illustrated stepping motor associated with the cams 46. The guide members 11 serve as a cam follower to be held in sliding contact with the cams 46.

As seen from FIG. 3, the optical axis L1 of the first lens 31 will be slanted from its upright position when the guide members 11 are caused to pivot about the axis 70 by the cam mechanism 45. It should be noted, however, that the slanting of the axis L1 is negligible because of the relatively great length of the guide members 11 and the relatively small pivot angle of the guide members 11. Thus, the alignment of the axis L1 with the axis L2 will not be impeded.

According to the present invention, a pair of eccentric cams may be used in place of the non-circular cams 46.

Figure 4:
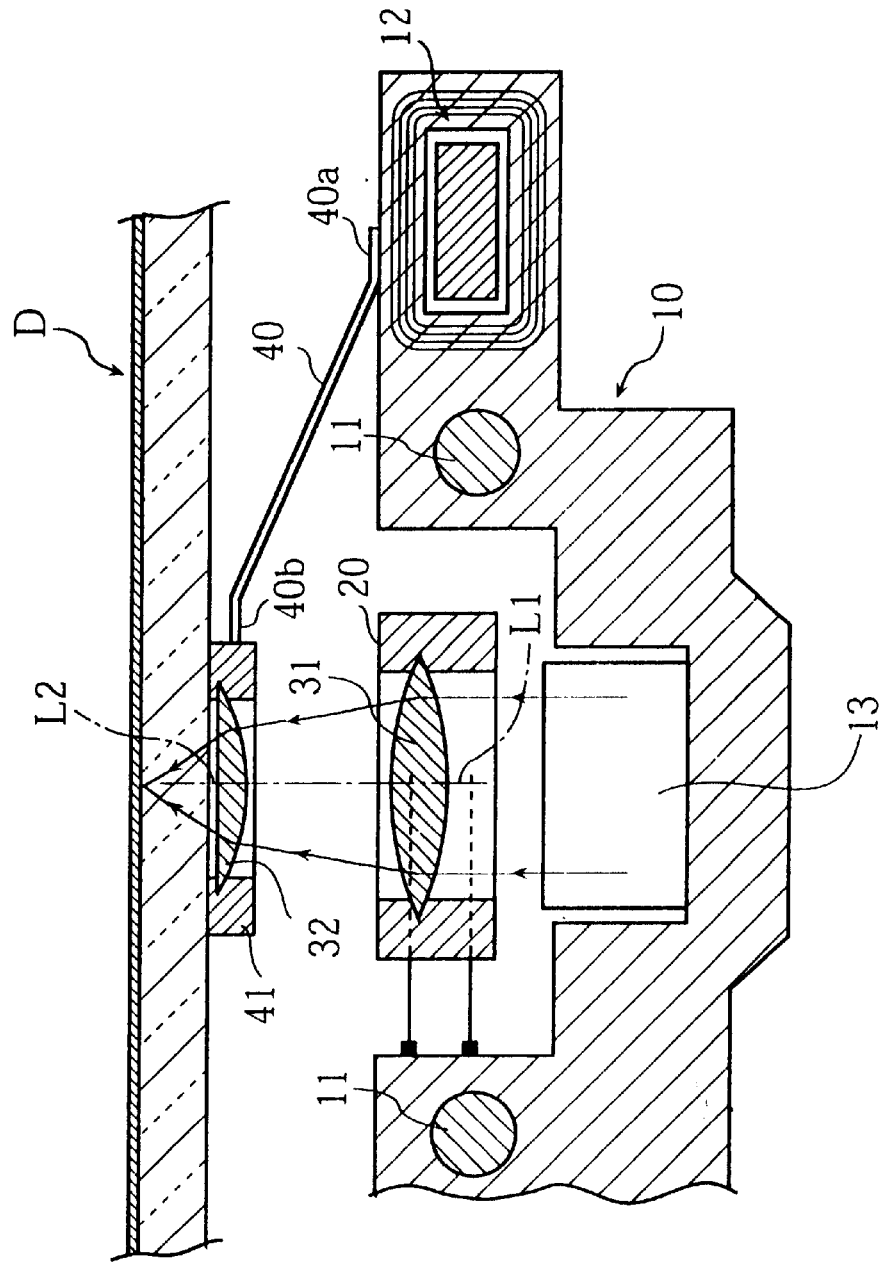
FIG. 4 is a sectional view showing two lenses and other components of the optical disk apparatus of FIG. 1, wherein the optical axes of the respective lenses coincide with each other.

As previously described, the suspension member 40 extends generally tangentially with respect to the tracks of the disk D as viewed from above, while also extending from the lower end 40a to the upper end 40b in a gradually approaching manner relative to the disk D as viewed in side elevation. Thus, when the carriage 10 is moved vertically (i.e., toward or away from the disk D), the suspension member 40 in contact with the disk D is deformed, so that the slanting angle of the suspension member 40 with respect to the disk D is changed. As a result, the second axis L2 is caused to shift tangentially with respect to the tracks of the disk D. This means that, even if the first axis L1 is offset from the second axis L2 by ΔT (see FIG. 2) along the track of the disk D, the two optical axes L1, L2 are shifted in position to coincide with each other, as shown in FIG. 4, by moving the carriage 10 vertically (downward in the particular case illustrated in FIG. 2).

Figure 5:
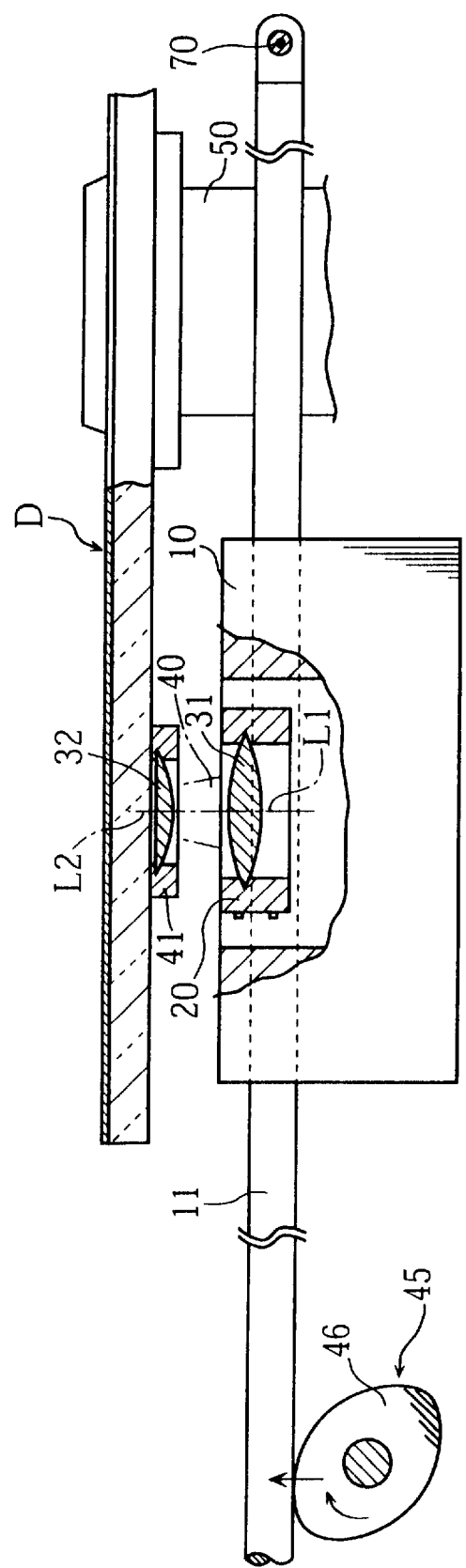
FIG. 5 is a sectional view showing, from a different angle, the two lenses with their optical axes aligned.

As mentioned above, the actuator 20 is operated not only for performing tracking and focus control but also for eliminating the discrepancy of the two axes L1 and L2 occurring radially of the disk D. To simultaneously perform the axis discrepancy elimination and the tracking control, a voltage required for the discrepancy elimination is applied to the actuator 20 together with the predetermined driving voltage for the tracking control. In this manner, while performing the tracking control, the actuator 20 can shift the first axis L1 relative to the second axis L2, so that the unfavorable gap ΔR between the two axes L1, L2 occurring radially of the disk D (see FIG. 3) is eliminated (see FIG. 5).

Figure 6:
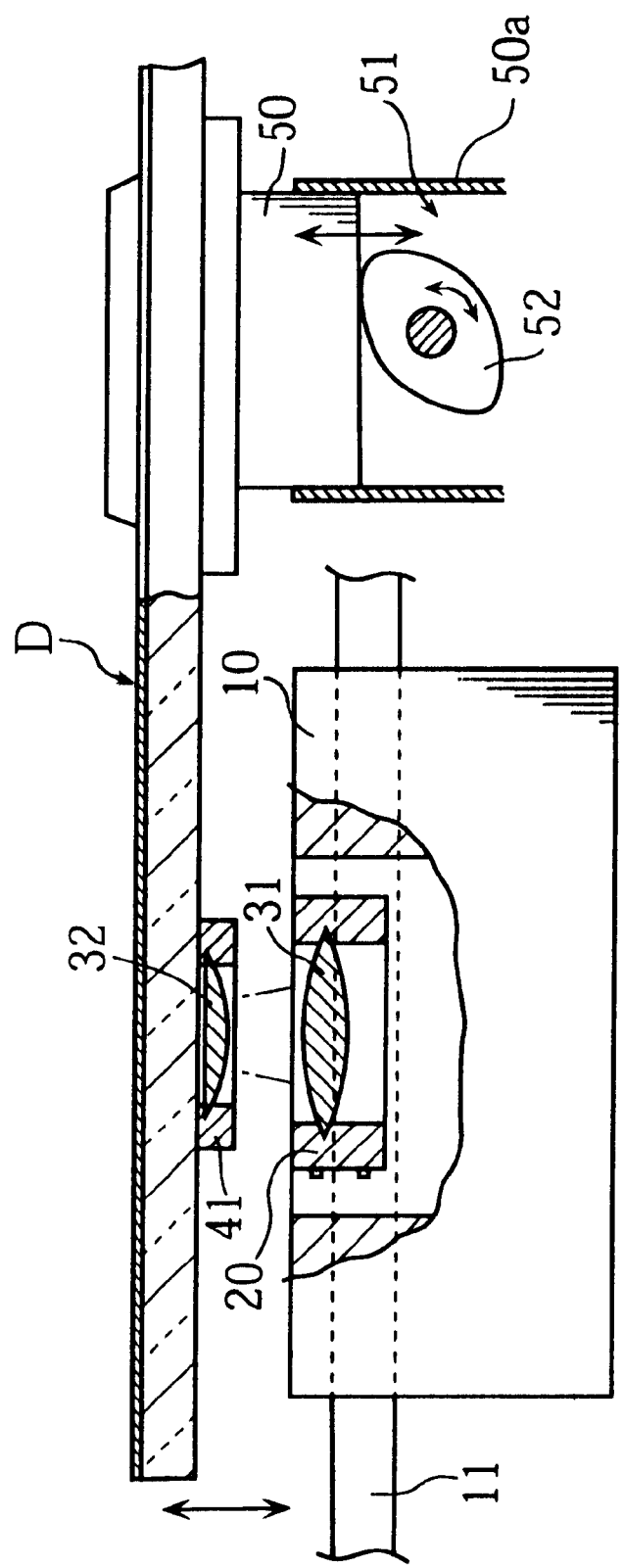
FIG. 6 is a partially sectional view showing an example of disk elevating mechanism.

In the first embodiment described above, it is the carriage 10 that is moved toward or away from the vertically stationary disk D for eliminating the discrepancy of the axes L1, L2. The present invention, however, is not limited to this. For instance, as shown in FIG. 6, use may be made of a disk elevating mechanism 51 which includes a rotatable, non-circular cam 52 held in sliding contact with the lower end of the spindle 50. The spindle 50 is supported by a cylindrical shaft 50a. The inner diameter of the shaft 50a is substantially equal to or slightly greater than the (outer) diameter of the spindle 50, so that the spindle 50 is snugly fitted into the shaft 50a. As illustrated, the shaft 50a allows the spindle 50 to move axially of the shaft 50a (vertically in FIG. 6). The cam 52 is fixed to a horizontal shaft associated with a stepping motor (not shown). In this manner, upon actuation of the stepping motor, the disk D attached to the spindle 50 can be moved upward or downward relative to the vertically stationary carriage 10.

Figure 7:
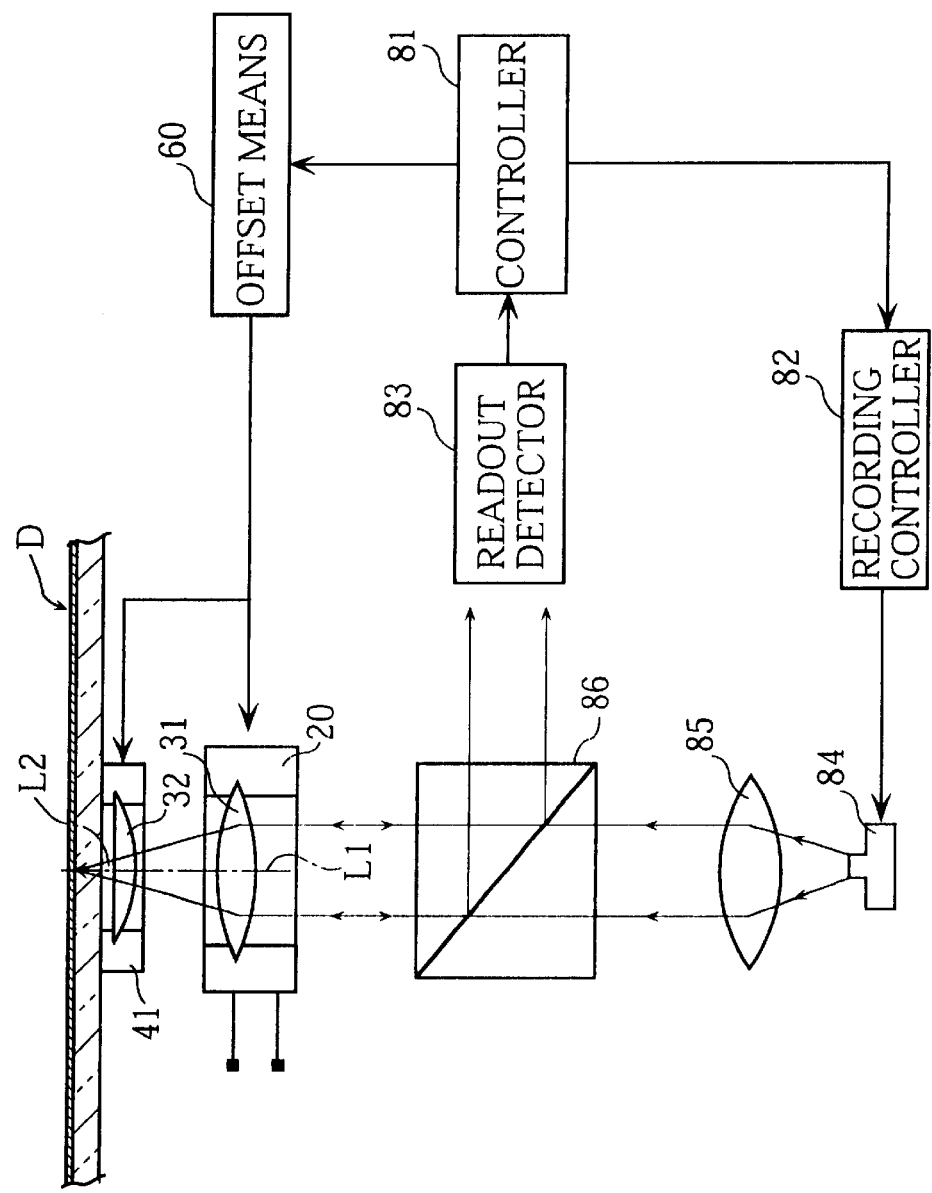
FIG. 7 is a schematic diagram illustrating a control system for controlling lens offset means.

Reference is now made to FIG. 7 illustrating the system for controlling the lens offset means 60. The system includes a principal controller 81 such as an MPU (microprocessing unit), a recording control unit 82 and a readout data detecting unit 83. The principal controller 81 controls the lens offset means 60 and the recording control unit 82.

The recording control unit 82 in turn controls a laser diode 84. Specifically, for writing data to the disk D, the recording control unit 82 controls the output of the laser diode 82 based on the employed recording method (i.e., light pulse modulation, magnetic field modulation, etc.). Also, for reading out data from the disk D, the laser diode 84 emits a laser beam of a predetermined power.

Light rays emitted from the laser diode 84 enter a collimator 85, and then leave it as a parallel beam. This parallel beam then passes through a beam splitter 86 and enters the first lens 31 and the second lens 32. The laser beam is caused to converge by the two lenses 31, 32 to make a laser spot on the recording surface of the disk D.

The light reflected on the recording surface of the disk D passes through the second lens 32 and the first lens 31 in this order. Then, as shown in FIG. 7, the reflected light enters the readout data detecting unit 83 via the beam splitter 86. The readout data detecting unit 83 detects the readout signals as well as focus error signals and tracking error signals. The readout signals, once detected by the detecting unit 83, are supplied to the principal controller 81. Then, based on the supplied readout signals, the principal controller 81 controls the lens offset means 60 in the manner described below. Besides this task, the principal controller 81 causes the actuator 20 to perform the focus control and the tracking control based on the focus error signals and the tracking error signals. Though not illustrated in FIG. 7, the optical disk apparatus is provided with a magnetic field generator to apply a recording magnetic field or readout magnetic field to the disk D in writing data to or reading data from the disk D.

With the above arrangements, the lens offset means 60 is controlled in the following manner for optimizing the distance between the first axis L1 and the second axis L2.

Figure 8A:
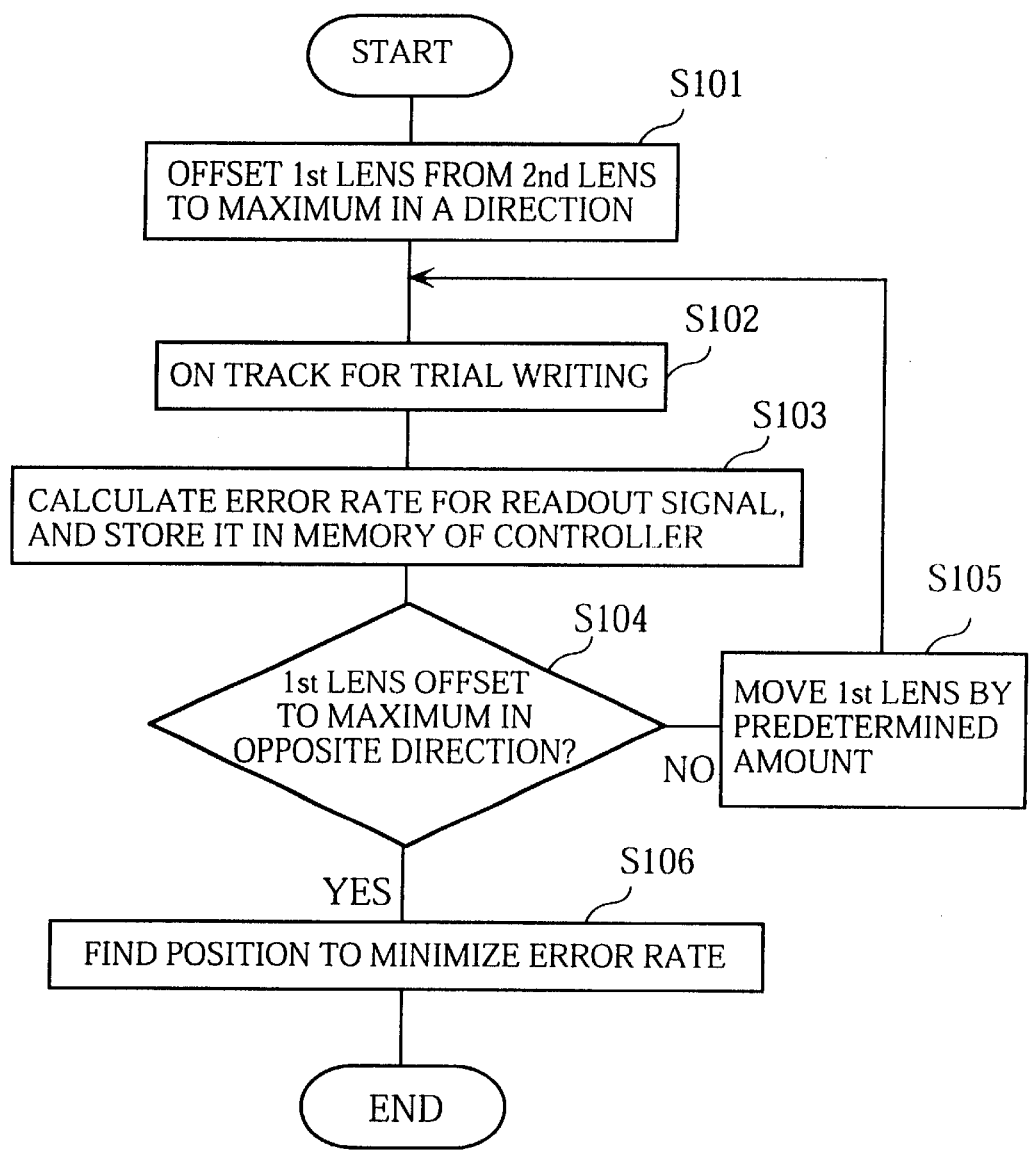
FIG. 8A is a flow chart showing a process of controlling the lens offset means.
Figure 8B:
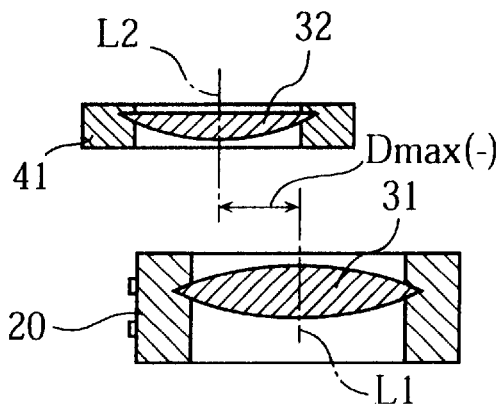
FIGS. 8B–8D are sectional views showing how the first and the second lenses are shifted in position relative to each other to find the optimum shifting amount of the two lenses.

Referring to FIGS. 8A and 8B, first, the lens offset means 60 is operated to bring the first axis L1 away from the second axis L2 to the extremity in one direction (S101). Specifically, the first shifting means 61 is operated to bring the carriage 10 to the highest (or lowest) level, while the second shifting means 62 (or actuator 20) is moved to the outermost (or innermost) position radially of the disk D. As a result, as shown in FIG. 8B, the first axis L1 is offset from the second axis L2 to the right ("initial direction") by a distance of Dmax(−).

Then, the optical head is brought into on-track condition to perform trial data-writing (S102 in FIG. 8A) based on predetermined data stored in a memory of the principal controller 81 (see FIG. 7). The written trial data is read out, and the error rate is calculated for the readout signals. The calculated error rate is stored in the memory of the controller 81 (S103).

Figure 8C:
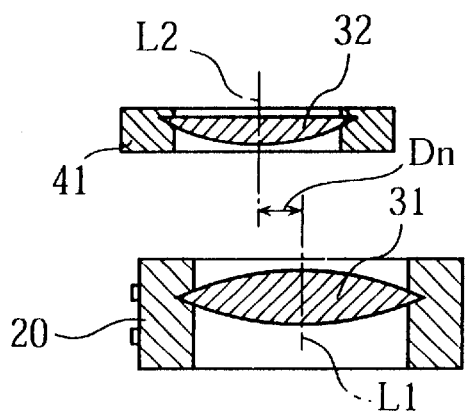

Then, the lens offset means 60 is operated so that the first axis L1 is brought closer to the second axis L2 by a predetermined amount (S105). Consequently, as shown in FIG. 8C, the first axis L1 may be spaced from the second axis L2 to the right by a distance of Dn. In this state, the above mentioned steps S102 and S103 (FIG. 8A) are performed. Then, though not illustrated, the first lens 31 is moved to the left relative to the second lens 32 by a predetermined amount. At this stage, the first axis L1 may still be located to the right of the second axis L2 or coincide with the axis L2 or go beyond the axis L2. Then, the above mentioned steps S102 and S103 are performed.

Figure 8D:
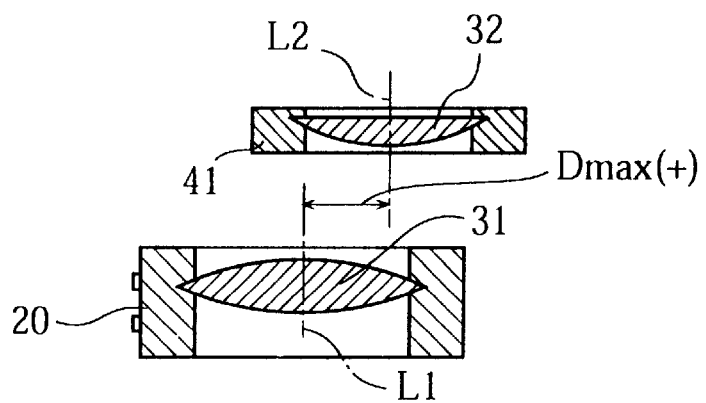

The above procedure is repeated until the first axis L1 is brought to the other extremity, whereby the first axis L1 is spaced from the second axis L2 to the left ("opposite direction") by a maximum distance Dmax(+), as shown in FIG. 8D.

After the first lens 31 is found to be offset from the second lens 32 by the maximum distance in the opposite direction (S104:YES), the optimal amount of offset is determined based on the error rates stored in the memory of the principal controller 81. Specifically, the optimal amount of offset is determined as the value at which the error rate is minimized. For the optimal amount of offset, the read and write margins are maximized.

Ideally, the optimal amount of offset should be determined by operating both the first shifting means 61 and the second shifting means 62 successively in the above-described manner. Specifically, the first shifting means 61 may operated first, while the second shifting means 62 is held at rest. Then, the second shifting means 62 is operated, while the first shifting means 61 is held at rest. According to the present invention, however, it is possible to perform the above determination procedure by operating either one of the first and the second shifting means.

After the optimal amount of offset is determined, the first shifting means 61 and/or the second shifting means 62 are operated to cause the first and the second axes L1, L2 to be moved toward each other by the determined offset value. Thereafter, data-writing or data-reading operations are performed.

Such an adjustment of the two axes may be performed only once with the optical disk apparatus. The timing for the axis adjustment may be when the very first data-writing and data-reading operations are performed. Instead, the axis adjustment may be performed whenever the optical disk apparatus is turned on to write and read data.

Once the disk apparatus is actuated, the axis adjustment may be performed at predetermined intervals for dealing with the thermal expansion of the suspension member which may increase with time.

Reference is now made to FIG. 9 showing the principal portions of an optical disk apparatus according to a second embodiment of the present invention. It should be noted that the components similar to those of the first embodiment are referred to by the same reference numerals, and that they may not be described in detail or at all.

According to the second embodiment, the first shifting means 61 includes a linear actuator 90 which may preferably be a piezoelectric element. As illustrated, the linear actuator 90 is mounted on the upper surface of the carriage 10 with part of it attached to a positioning piece 10a fixed to the carriage 10. The actuator 90 is caused to expand or contract on the carriage 10 in the direction tangential to the tracks of the disk D. The suspension member 40 has a lower end connected to the slidable part of the actuator 90.

With such an arrangement, the suspension member 40 is caused to move relative to the carriage 10 tangentially to the disk D. Thus, it is possible to displace the optical axes of the first and the second lenses 31, 32 relative to each other in the tangential direction. As readily seen, in this case, no carriage elevating mechanism as in the first embodiment is required.

In the second embodiment, the actuator 20 serves as the second shifting means 62 to move the first lens 31, as in the first embodiment. Thus, by operating the actuator 20, the two lenses 31, 32 are caused to shift in position relative to each other radially of the disk D.

Figure 10:
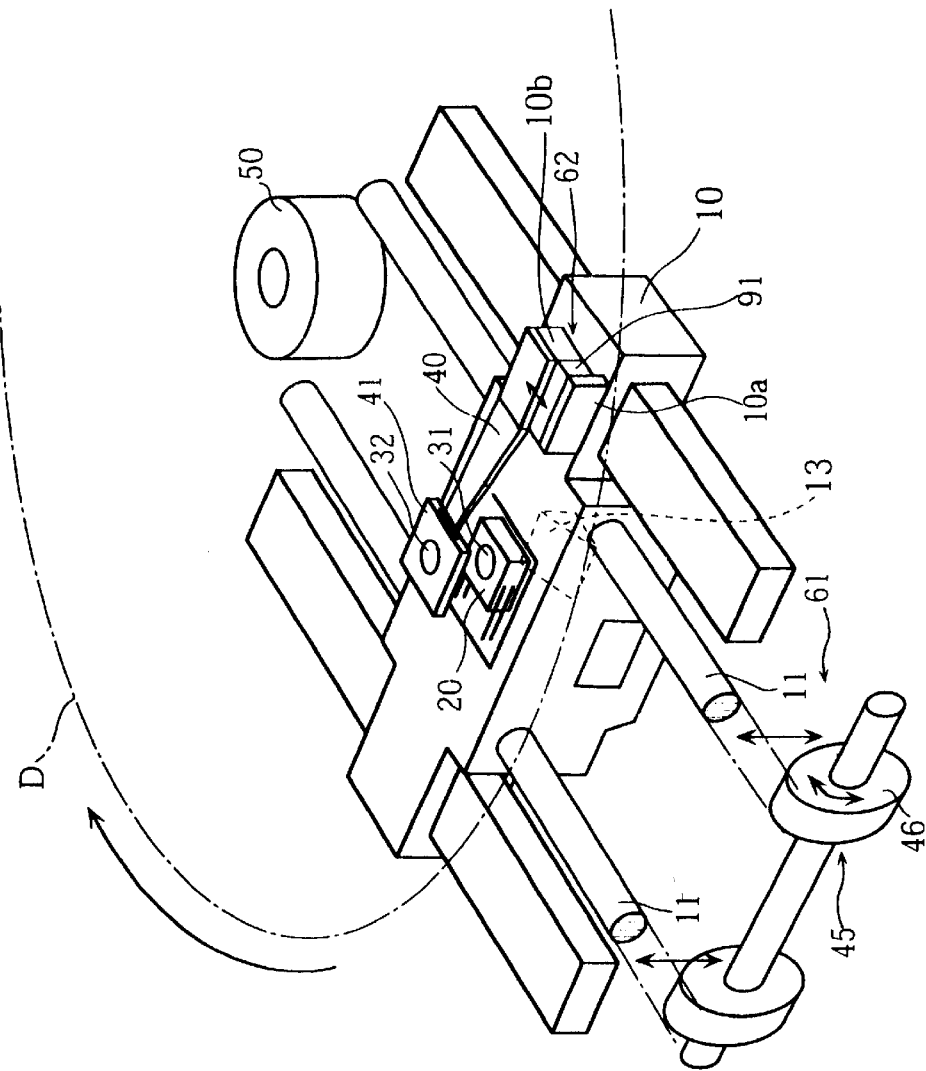
FIG. 10 is a perspective view showing the principal portions of an optical disk apparatus according to a third embodiment of the present invention.

FIG. 10 shows the principal portions of an optical disk apparatus according to a third embodiment of the present invention. In this embodiment, the first shifting means 61 is the same as that of the first embodiment (see FIG. 1). The second shifting means 62 includes a linear actuator 91 mounted on the carriage 10. As in the second embodiment described above, the linear actuator 91 may be a piezoelectric element a part of which is attached to a positioning piece 10a fixed to the carriage 10. As illustrated, the actuator 91 is allowed to expand and contract on the carriage 10 in the tracking direction. The lower end of the suspension member 40 is connected to the actuator 91 via a connection piece 10b which is slidable on the carriage 10.

Upon actuation of the linear actuator 91, the suspension member 40 is moved radially of the disk D, and hence the two optical axes of the first and the second lenses 31, 32 are moved relative to each other in the tracking direction. In the third embodiment, both the first and the second shifting means 61, 62 are provided separately from the actuator 20 holding the first lens 31. Thus, the actuator 20 is operated exclusively for performing the tracking control and the focus control with respect to the disk D.

Figure 11:
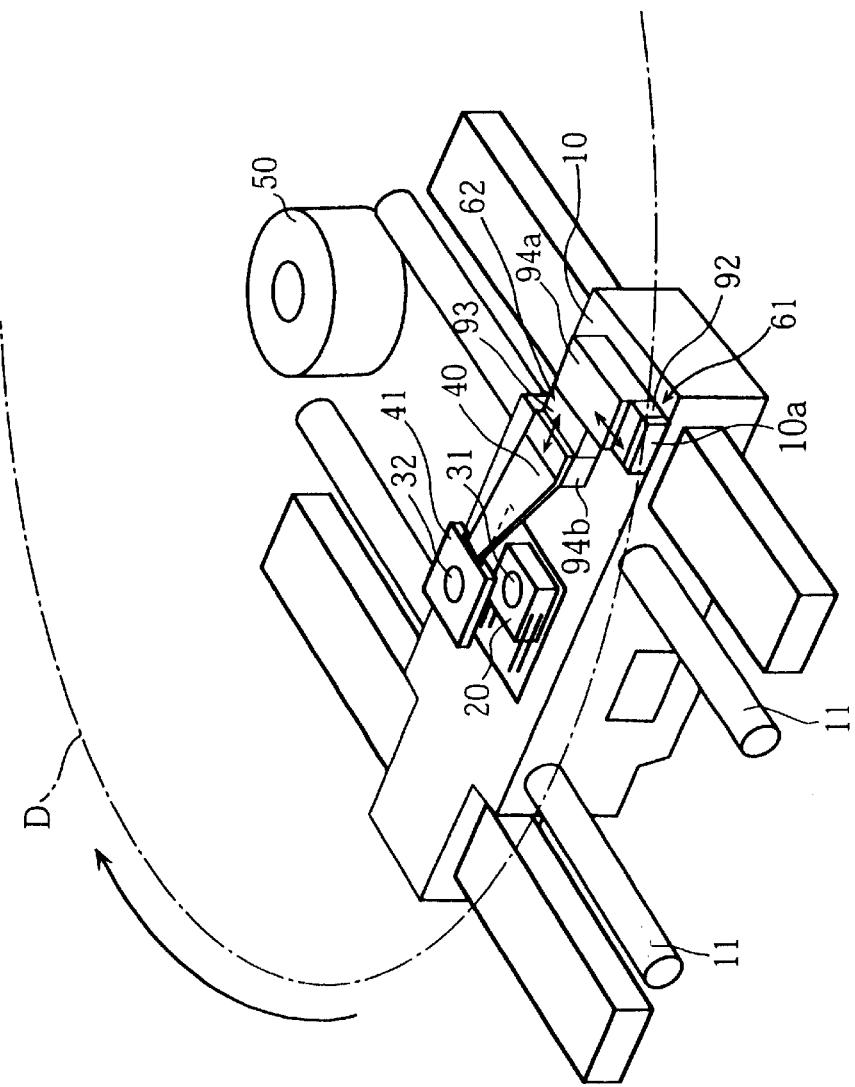
FIG. 11 is a perspective view showing the principal portions of an optical disk apparatus according to a fourth embodiment of the present invention.

FIG. 11 shows the principal portions of an optical disk apparatus according to a fourth embodiment of the present invention. In this embodiment, both the first shifting means 61 and the second shifting means 62 are linear actuators 92 and 93, respectively, which may be a piezoelectric element. The first shifting means 61 is arranged between a positioning piece 10a fixed to the carriage 10 and a first connection piece 94a which is slidable on the carriage 10. The first shifting means 61 is attached to the positioning piece 10a and the connection piece 94a. The first shifting means 61 is arranged to expand and contract in the tracking direction, whereby the first connection piece 94a is moved radially of the disk D.

The second shifting means 62 is arranged between the first connection piece 94a and a second connection piece 94b. The second connection piece 94b is fixed to the second shifting means 62 and to the lower end of the suspension member 40. The second shifting means 62 is slidable on the carriage 10. The second shifting means 62 is arranged to expand and contract tangentially to the disk D. Thus, by operating the first and the second shifting means 61 and 62, the optical axes of the two lenses 31, 32 are offset from each other or caused to coincide. In the fourth embodiment, no carriage elevating mechanism as in the first embodiment is required.

Figure 12:
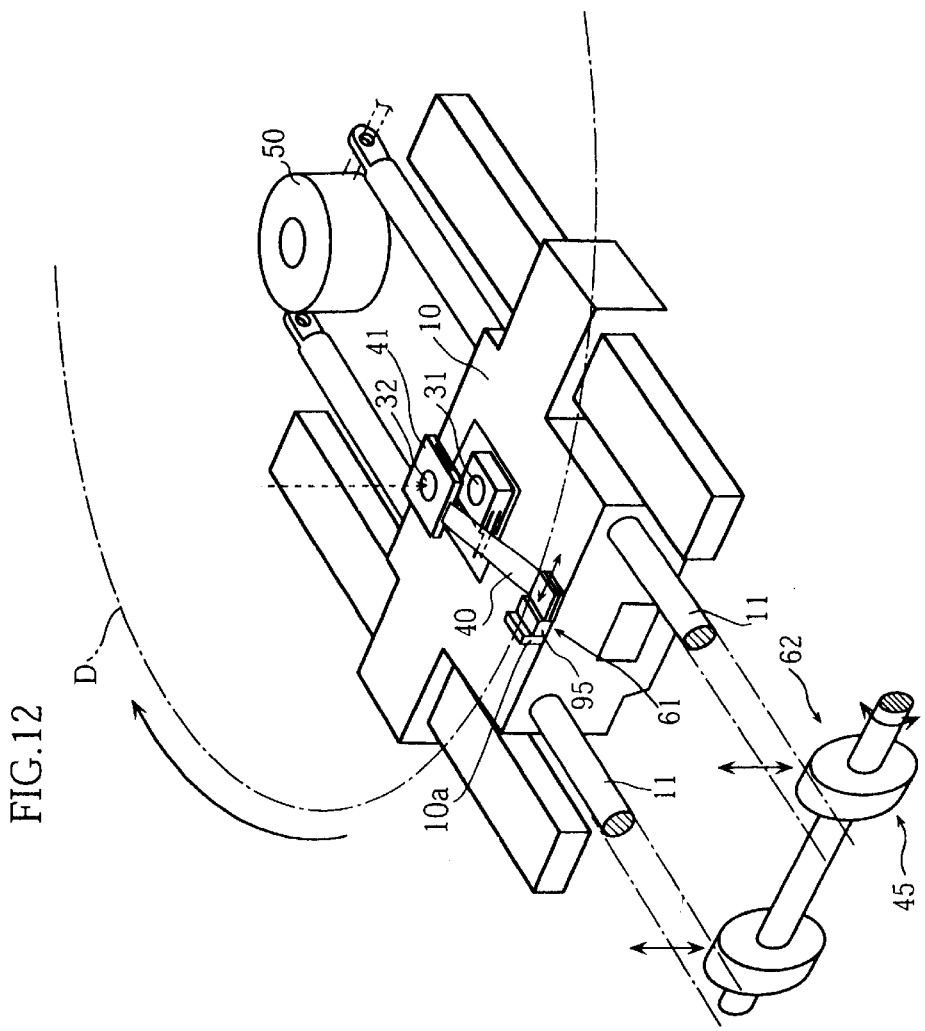
FIG. 12 is a perspective view showing the principal portions of an optical disk apparatus according to a fifth embodiment of the present invention.
Figure 13:
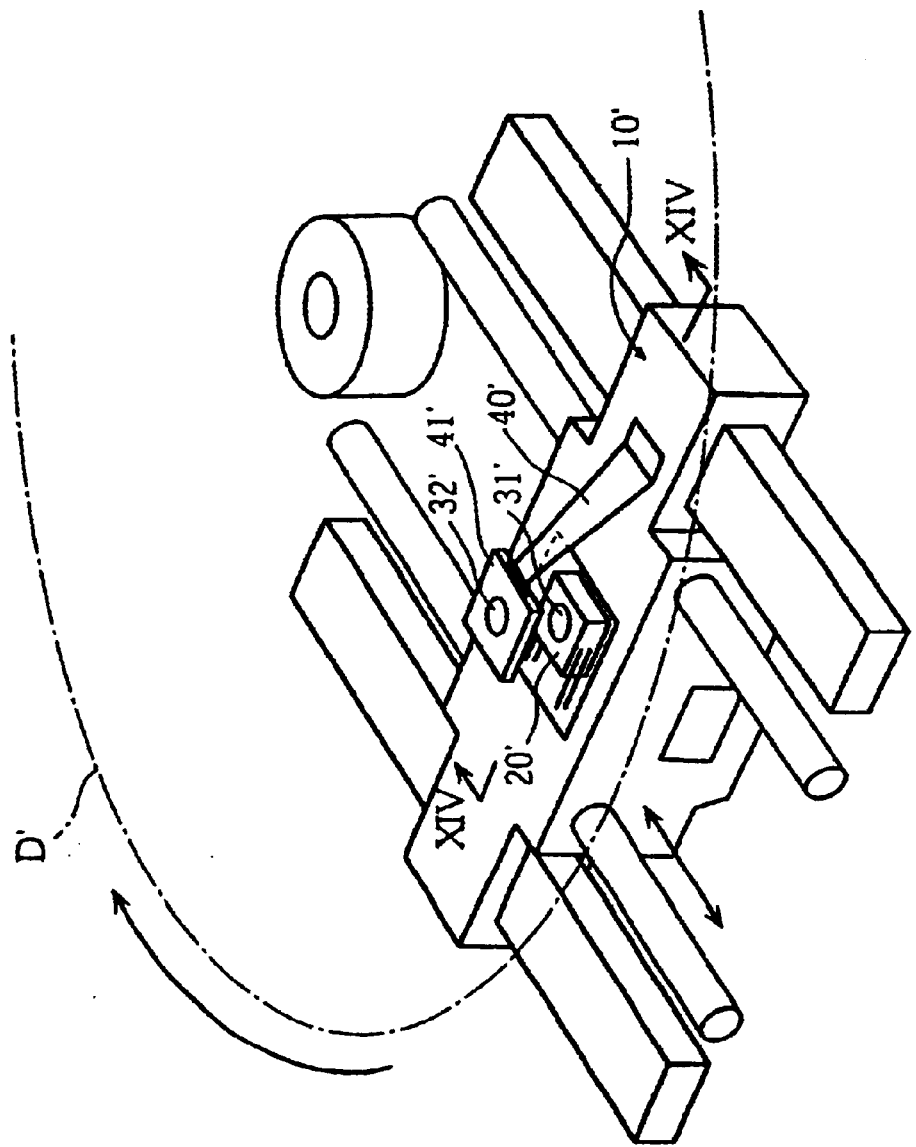
FIG. 13 is a perspective view showing the principal portions of an optical disk apparatus.
Figure 14:
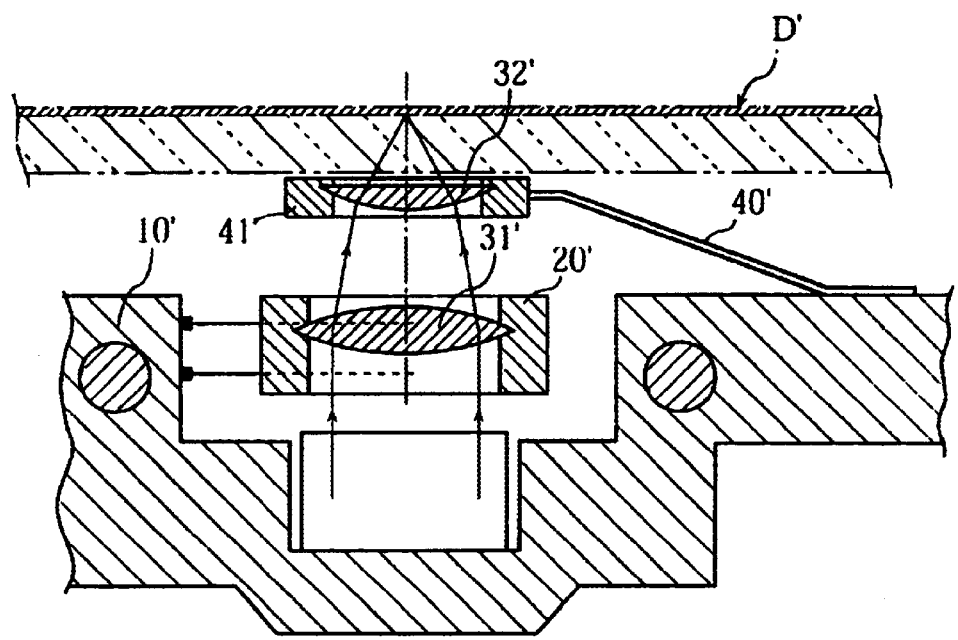
FIG. 14 is an enlarged sectional view taken along lines XIV—XIV in FIG. 13.

FIG. 12 shows the principal portions of an optical disk apparatus according to a fifth embodiment of the present invention. Differing from the previous ones, the suspension member 40 of this embodiment extends in the tracking direction rather than in the tangential direction of the disk D. The first shifting means 61 includes a linear actuator 95 attached to a positioning piece 10a fixed to the carriage 10. The lower end of the suspension member 40 is attached to the linear actuator 95, which is arranged to expand and contract tangentially to the disk D. Accordingly, the suspension member 40 (hence the second lens 32) is moved tangentially to the disk D upon actuation of the linear actuator 95.

The second shifting means 62 includes, as in the first embodiment (FIG. 1), a cam mechanism for moving the carriage 10 toward or away from the disk D. When the carriage 10 is moved toward the disk D with the slider 41 held in contact with the disk D, the suspension member 40 will be deformed or bent to a greater extent. As a result, the second lens 32 held by the slider 41 is moved radially of the disk D toward the center of the disk D. As the carriage 10 is moved away from the disk D, on the other hand, the suspension member 40 will be restored to its original position, thereby causing the second lens 32 to be moved farther away from the center of the disk D. In this manner, the optical axes of the two lenses 31, 32 can be offset from each other or caused to coincide with each other.

In the above-described embodiments, use is made of a linear driving mechanism for moving the carriage 10 radially of the disk D. The present invention, however, is not limited to this manner. Instead of the linear driving mechanism, a swing arm pivotable about a predetermined axis may be employed to support the carriage 10. In such an instance, the carriage 10 can be moved substantially linearly toward or away from the center of the disk D.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. An optical disk apparatus comprising:
   a carriage movable relative to a data-storing disk member;
   an actuator mounted on the carriage and movable at least for performing focus control;
   a first lens supported by the actuator and having a first optical axis;
   an elastically deformable suspension member provided with a first end and a second end, the suspension member being supported by the carriage via the first end;
   a slider attached to the second end of the suspension member and brought into facing relation to the disk member;
   a second lens supported by the slider and having a second optical axis, the second lens being associated with the first lens to make a light spot on the disk member; and
   an optical axis adjuster provided separately from the actuator and arranged to move the first and the second optical axes relative to each other in predetermined direction parallel to the disk member;
   wherein the optical adjuster comprises a shifting mechanism which causes the carriage and the disk member to be moved toward and away from each other for elastically deforming the suspension member to move the first and the second optical axes relative to each other in said predetermined direction.

2. The optical disk apparatus according to claim 1, wherein the optical axis adjuster further includes another shifting mechanism for moving the first and the second optical axes relative to each other in another direction perpendicular to said predetermined direction.

3. The optical disk apparatus according to claim 2, wherein said another shifting mechanism includes an additional actuator mounted on the carriage for moving the suspension member radially of the disk member.

4. The optical disk apparatus according to claim 3, wherein the additional actuator comprises a piezoelectric element.

5. The optical disk apparatus according to claim 1, wherein the first end and the second end of the suspension member are spaced from each other tangentially to a track of the disk member.

6. The optical disk apparatus according to claim 1, wherein the actuator is a two-dimensional actuator movable for positional adjustment of the first and the second optical axes.

7. The optical disk apparatus according to claim 1, wherein the first end and the second end of the suspension member are spaced from each other radially of the disk member.

8. The optical disk apparatus according to claim 7, wherein said another shifting mechanism includes an additional actuator mounted on the carriage for moving the suspension member tangentially to a track of the disk member.

9. The optical disk apparatus according to claim 1, wherein the shifting mechanism includes at least one elongated guiding member movably supporting the carriage, the guiding member having a pivotably connected end.

10. The optical disk apparatus according to claim 9, wherein the shifting mechanism includes a cam held in engagement with the guiding member at a predetermined portion thereof spaced from the pivotably connected end.

11. The optical disk apparatus according to claim 10, wherein the carriage is reciprocated between said predetermined portion and the pivotably connected end.

12. The optical disk apparatus according to claim 1, wherein the shifting mechanism includes a cam for causing the disk member to move toward and away from the carriage.

13. The optical disk apparatus according to claim 12, further comprising a spindle for rotating the disk member, wherein the cam is held in engagement with the spindle.

14. The optical disk apparatus according to claim 13, further comprising a cylindrical shaft for holding the spindle in an axially slidable manner.

* * * * *